United States Patent [19]

Brinner et al.

[11] 4,051,421

[45] Sept. 27, 1977

[54] BRAKING MODE CONTROL FOR A CHOPPER CONTROLLED D-C ELECTRIC MOTOR

[75] Inventors: Thomas Richard Brinner; Thomas Deltor Stitt, both of Erie, Pa.

[73] Assignee: General Electric Company, Erie, Pa.

[21] Appl. No.: 641,217

[22] Filed: Dec. 16, 1975

[51] Int. Cl.² .............................................. H02P 3/14
[52] U.S. Cl. ................................... 318/367; 318/376; 318/380
[58] Field of Search ............... 318/341, 367, 375, 376, 318/379, 380

[56] References Cited

U.S. PATENT DOCUMENTS

| 3,769,565 | 10/1973 | Littwin | 318/380 |
| 3,883,786 | 5/1975 | McNaughton et al. | 318/341 X |
| 3,947,740 | 3/1976 | Tsuboi | 318/376 |
| 3,983,465 | 9/1976 | Tsuboi et al. | 318/376 |
| 3,995,204 | 11/1976 | Konrad et al. | 318/367 |

*Primary Examiner*—Robert K. Schaffer
*Assistant Examiner*—W. E. Duncanson, Jr.

*Attorney, Agent, or Firm*—James H. Beusse

[57] ABSTRACT

A control system for effecting smooth braking resistor staging of a chopper controlled direct current electric motor. The control system utilizes auxiliary switches mechanically coupled to resistor by-pass contacts to sense actual motion of the by-pass contacts and to provide signals for reducing the chopper duty factor. In a preferred embodiment the chopper duty factor is reduced to an intermediate level between maximum and minimum duty factor by modification of an error signal representing the difference between actual motor current and commanded motor current so as to maintain the control system in a closed loop condition. In a further embodiment during dynamic braking the chopper duty factor is limited to a level sufficient to assure adequate operating voltage by checking for a minimum voltage level on a line filter capacitor, which capacitor supplies power for separate field excitation, whenever the chopper is at maximum duty factor and immediately reducing the duty factor if the capacitor voltage is less than the minimum voltage.

14 Claims, 4 Drawing Figures

BRAKING MODE CONTROL FOR A CHOPPER CONTROLLED D-C ELECTRIC MOTOR

BACKGROUND OF THE INVENTION

The present invention relates to control systems for direct current electric motors and, more particularly, to a control system for providing smooth resistor staging of a chopper controlled electric traction motor.

Direct current (d-c) electric motors are often used in traction vehicle drive applications such as, for example, electric locomotives or transit cars. In such applications motive power is controlled by regulating motor current, typically by means of a control system employing a chopper. The chopper control system is essentially a controlled switching system connected in the energizing circuit of the motor armature so as to meter current to the motor by periodically opening and closing. The ratio of the closed time of the switching system to the sum of the closed time and the open time is the duty factor of the system. During the closed period of the chopper, the motor armature windings are connected to a power source through a path of relatively low resistance and current builds toward some peak value. During the open period of the chopper, the resistance in this energizing circuit is increased and armature current, circulating through a free wheeling diode, decays from the magnitude attained during the chopper closed time. In this manner, pulses of current are periodically applied to the motor and an average motor current is established. The average motor current tends to remain relatively constant due to the smoothing action of the circuit inductance. In general, the circuit inductance is sufficient to smooth the pulsating current and prevent jerking or lurching of the vehicle so long as the current pulses are supplied at relatively frequent rates, such as for example, 200 to 400 Hz.

An advantage of the chopper controlled d-c motor system is the relatively simply implementation of electrical braking. In electrical braking the d-c motor is operated as a generator with current generated by the armature windings being dissipated in a braking resistance (dynamic braking) or being forced back to the source (regenerative braking). The chopper control system operates in the braking mode in a manner similar to its operation in the driving mode, i.e., braking torque is regulated by the chopper by control of the average armature currents. In braking, however, the armature generated voltage may be allowed to be several times the magnitude of the source voltage in order to obtain the desired braking torque. Consequently, during the "off" time of the chopper, the peak voltage across the chopper may rise to a level several times as high as the source voltage. This braking characteristic necessitates the use of sophisticated and expensive components capable of withstanding such large applied voltages without destructive effect. One method which is commonly employed to avoid the necessity of using chopper components capable of withstanding such relatively high voltages is to connect the chopper in shunt with a first resistor which is serially interconnected with a plurality of additional resistors in the motor current path in a voltage dividing manner, thereby reducing the voltage impressed across the controlled switch in the chopper when turned off. In using this resistive voltage divider approach it is apparent that some means must be provided for removing the additional series connected resistors from the current path when it is desired to increase the average current in order to maintain the desired level of braking torque.

In order to remove the resistors from the motor current path it has been common practice to provide power switching means such as electromechanical contactors or cam actuated switches respectively associated with the additional resistors, thereby formaing a plurality of resistor stages. By actuating the power switching means, selected resistors may be short-circuited or bypassed. It will be appreciated that staging or short-circuiting of a resistor is only necessary when motor current must be increased to a magnitude greater than is possible by advancing the chopper duty factor to unity. It is also apparent that since each stage represents a finite resistance, short-circuiting of a stage will result in a step of voltage being applied to the motor. This step of voltage creates a current transient, which current transient may result in an unacceptable jerk or lurch of the vehicle. Although it would be possible to minimize this current transient by utilizing many small resistance stages rather than a few large stages, this approach would defeat the overall goal of economizing both cost and space.

In the operation of a control system using staging, the resistance stages are normally in series circuit arrangement with the chopper. When the duty factor of the chopper has been increased to its maximum limit and further voltage or current is required, a signal is directed to one of the resistance stages causing the associated contactor to close and shor-circuit the resistor thus raising the magnitude of voltage available for application to the motor. Obviously, unless some action is taken at the same time as the power switching means is actuated, a current transient may be applied to the motor resulting in a sudden jerk. The general practice is to size the resistors in each stage such that each is equivalent to the effective resistance represented by the difference in impedance of the chopper from maximum duty factor to minimum duty factor. The chopper can then be returned to its minimum duty factor when a stage is short-circuited and the net change in voltage applied to the motor will be nil. The chopper duty factor may then be smoothly increased to its maximum limit and the process repeated. The difficulty with such a method is in coordinating the actuation of the power switching means with the change of duty factor of the chopper. For example, at a 400 Hz pulse rate, an error or ⅛ second will allow 200 current pulses of an incorrect time duration to be applied to the motor and can result in a noticeable jerk. In practice of error of 0.040 seconds has been found to produce a noticeable jerk. Accordingly, various schemes have been devised for minimizing the effects of such stage changing.

One prior art approach to stage changing is illustrated in U.S. Pat. No. 3,581,172. In this patent a basic embodiment demonstrates stage changing by fully turning off the chopper at the same instant as a signal is sent to actuate a power switching means. The chopper is then maintained in a non-operative status until a fixed interval after the power switching means has closed, the interval being determined by the time required for the control circuit to change the chopper duty factor to a minimum limit. A further embodiment described in U.S. Pat. No. 3,581,172 employs current sensors associated with each resistor stage. In this embodimment the chopper remains at maximum duty factor until a power switch has been closed and a surge of current though the power switch has been detected. The chopper is then immediately returned to its minimum duty factor and held at that point for a time interval sufficient to allow the control system to recover and change to a minimum duty factor output command. The basic embodiment described above suffers from a relatively large gap in power applied to the motor during the time required for closing of the contactor. The closing time of commercially available contactors typically exceeds 0.1 second. Such a delay can result in an uncomfortable ride. In addition, the illustrated control system is placed in an open loop condition for more than 0.5 second during which time no corrections can be made for external influences such as, for example, a line voltage surge or a line voltage failure. The second embodiment overcomes the problem of power switch closing time but still places the control system in an open loop condition. Furthermore, the system does not respond until after a current surge has actually occurred thus raising a spectre of sudden lurch of the motor, the magnitude of which depends upon how fast the control system can be disabled. The method of stage chaning described in U.S. Pat. No. 3,581,172 thus falls short of ideal coordination of the staging transitions.

In addition to the staging problems during dynamic braking some d-c motor control systems rely on energy generated by the motor armature and stored in the line filter to control braking effort. These systems typically draw current from the line filter capacitor (which is connected across the input power terminals) and utilize this current to supply the motor field winding. Normally armature current is shunted through the free wheeling diode to the filter capacitor during chopper off time and maintains adequate stored energy to supply the field. However, in dynamic braking when the chopper is operating at maximum duty factor, the off time may be insufficient to maintain at at least a minimum level of energy in the filter capacitor and braking control may be lost. Accordingly, some means must be provided for assuring a minimum sustaining energy level in the line filter capacitor.

It is therefore an object of this invention to provide an improved d-c motor control system with smooth resistor staging.

It is a further object of this invention to provide an improved d-c motor control system including apparatus for maintaining at least a predetermined energy storage level for field control during dynamic braking.

SUMMARY OF THE INVENTION

The present invention provides a method and apparatus for smooth resistor staging of a chopper controlled electric motor by means of a control system which detects actual movement of a resistor by-pass contactor and effects a reduction in chopper duty factor only during such movement. In one embodiment the by-pass contactors are controlled by cams driven by a pilot motor. Additional cams driven by the pilot motor control other logic switches which are used to provide logic signals indicative of the actual position of the driven cams. The logic signals are applied to the chopper control to effect a duty factor reduction during a predetermined increment of position of the by-pass contactor. In a further embodiment the cam actuated contactors are replaced by electromechanical contactors wherein the logic switches are mechanically coupled to the by-pass contactors. In this embodiment, the logic switches are arranged in pairs with a first pair operating after movement of the by-pass contactor has begun and a second pair operating immediately after the by-pass contactor has made and started wiping. In this manner the actual motion of the by-pass contactor is utilized as a criteria for determining the time at which to reduce the chopper duty factor. In both embodiments the logic switches modify the control system error signal to thereby reduce the chopper duty factor without changing the closed loop configuration of the system.

In a still further embodiment a comparator monitors both the chopper duty factor and the available supply voltage, the comparator being arranged to limit the chopper duty factor when the available supply voltage falls below a predetermined level sufficient to maintain adequate braking control.

BRIEF DESCRIPTION OF THE DRAWINGS

The invention will be better understood and its various objects and advantages will be more fully appreciated from the following description taken in conjunction with the accompanying drawings in which.

DETAILED DESCRIPTION

Figures 1, 2:
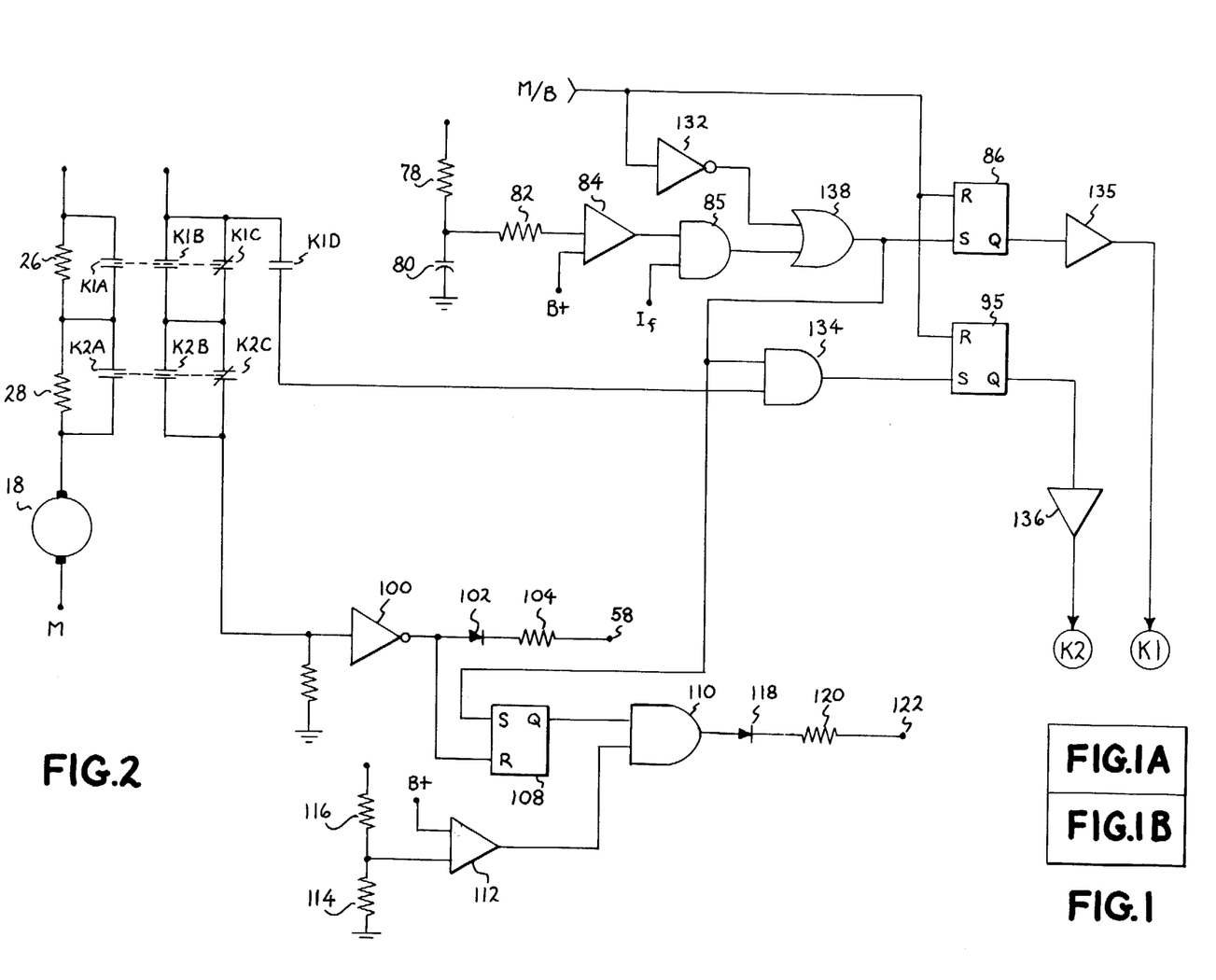
FIG. 1 shows the manner in which FIGS. 1A and 1B should be combined to make up a single schematic diagram of the control circuits used in accordance with the present invention.
FIG. 2 is a modification of FIG. 1 showing the present invention in combination with electromechanical resistor staging contactors.
Figure 1A:
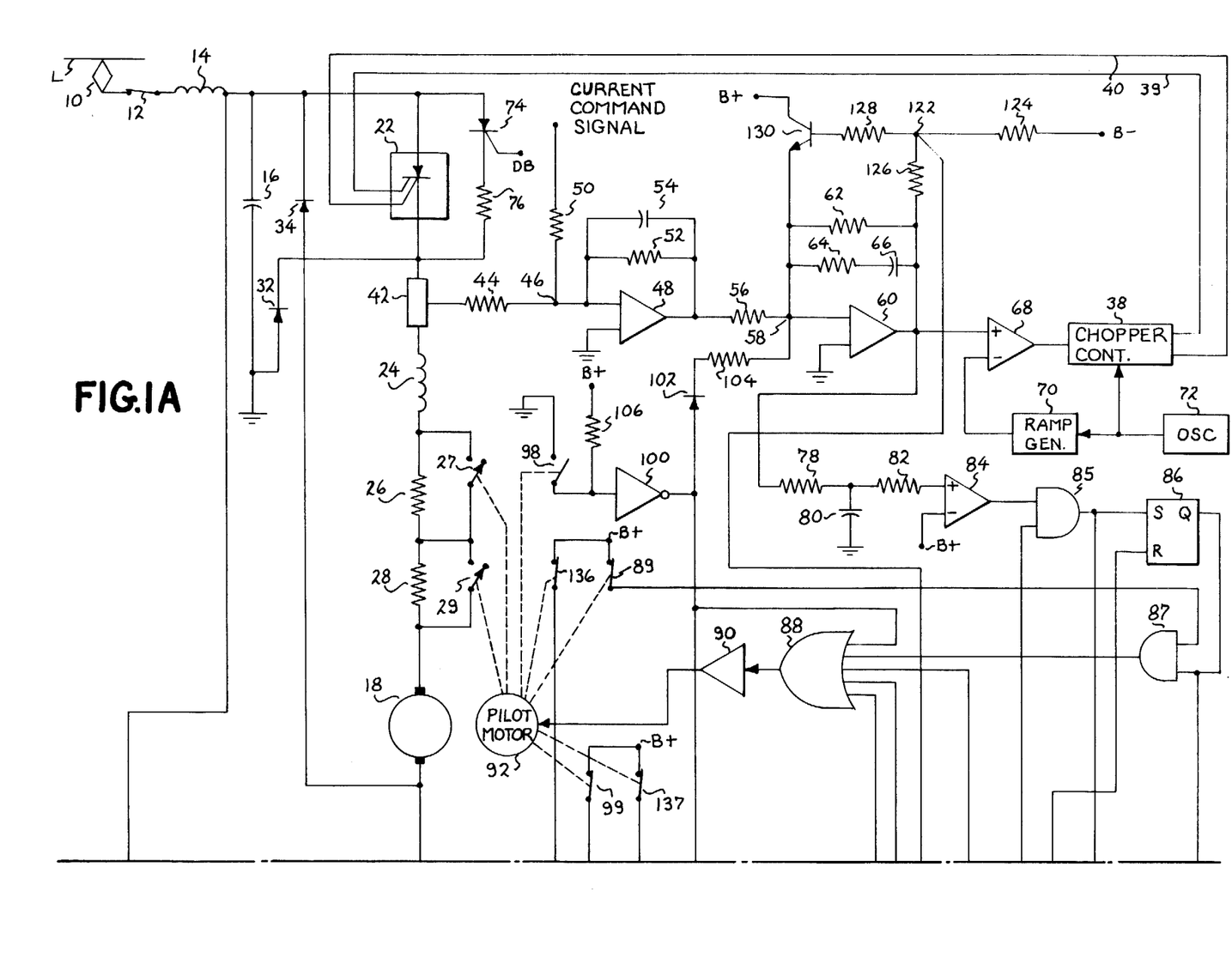
FIG. 1A is a first portion of a partial block/schematic diagram of a motor control circuit according to the present invention using cam controlled switching elements.
Figure 1B:
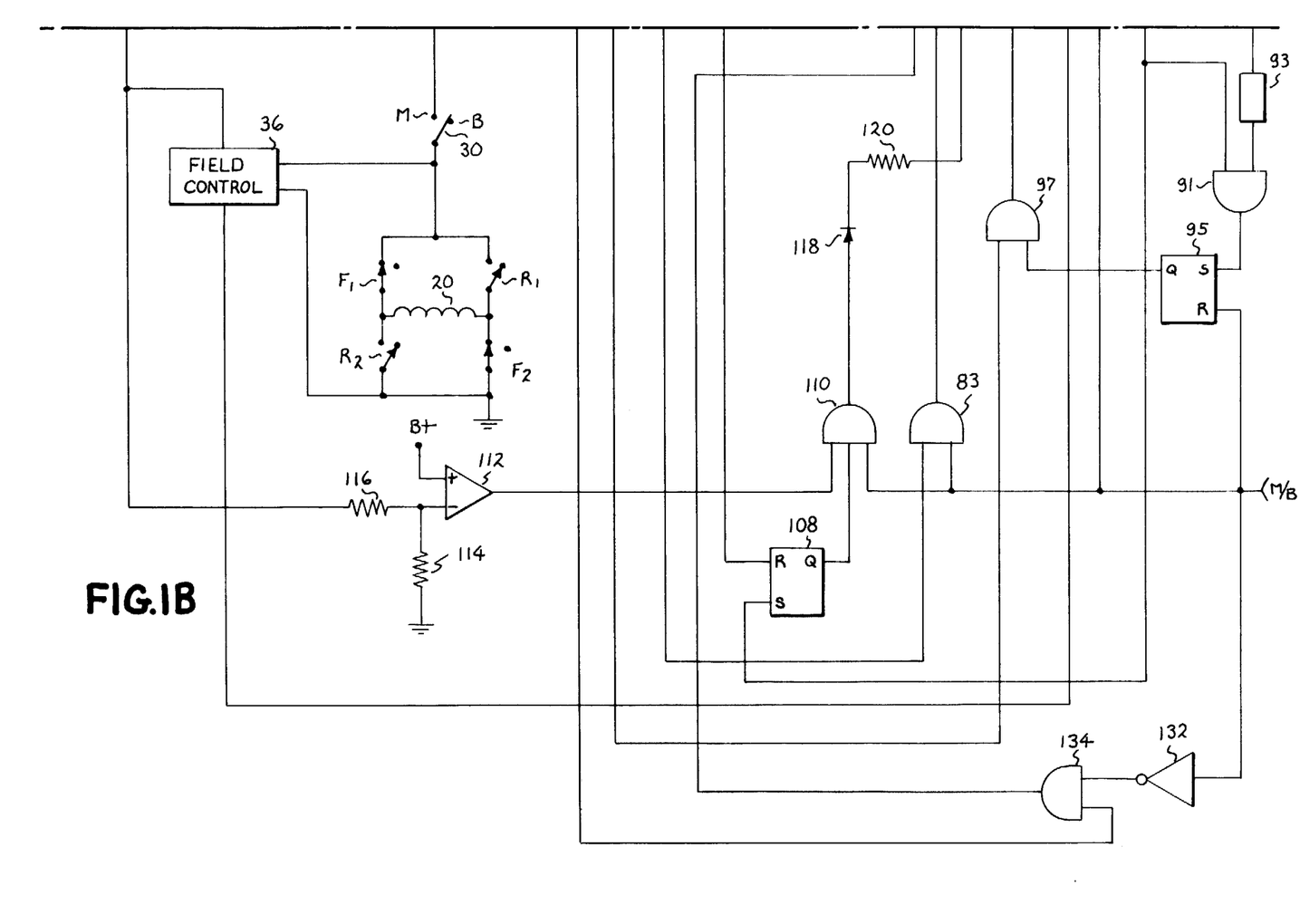
FIG. 1B is a last portion of a partial block/schematic diagram of a motor control circuit according to the present invention using cam controlled switching elements.

Referring now to FIG. 1 there is shown a simplified schematic block diagram of one embodiment of the present invention as applied to a traction vehicle motor control system in which resistor staging is effected by cam actuated switches and contacts. Hereinafter references to FIG. 1 will be understood to include the schematic/block diagram as illustrated in FIGS. 1A and 1B. Power for the motor control system is supplied by means of a power line, L, connected to the system through a pantograph arrangement 10 and a line breaker 12. Connected to the control side of line breaker 12 is a line filter comprising an inductor 14 and a capacitor 16. The voltage developed at the junction intermediate inductor 14 and capacitor 16 is applied by means of a chopper circuit 22 to a traction motor comprising an armature 18 and a field winding 20. The chopper circuit 22 may be of a type well known in the art such as that described in the *SCR Manual*, Fifth Edition, published in 1972 by the General Electric Company, Semiconductor Products Dept., Schenectady, New York. Serially connected between chopper circuit 22 and motor armature 18 are a smoothing reactor 24 and first and second current limiting resistors 26 and 28. Cam actuated resistor by-pass contacts 27 and 29 are connected in parallel with corresponding resistors 26 and 28 respectively. Contacts 27 and 29 are in a normally closed position during motoring and are arranged to open when electrical braking is commanded. Motor armature 18 is connected to field winding 20 by means of a motor-brake switch 30 and a set of field reversing contactors $F_1$, $F_2$ and $R_1$, $R_2$. A free wheeling diode 32 connected in parallel with the series combination of motor armature 18 and field winding 20, provides a current path for armature current and field current during the off time of chopper 22. A flyback diode 34 provides an armature current path during braking of the motor when motor-brake switch 30 is in the open position illustrated in FIG. 1.

A field control circuit 36 such as that described in U.S. Pat. No. 3,866,098 — Weiser issued Feb. 11, 1975 and assigned to the General Electric Company, is connected in parallel with field winding 20 and provides means for field weakening while in the motoring mode and for controlling braking current through field current control during electrical braking of the motor. Armature current is regulated by chopper circuit 22 which circuit 22 functions in a manner well known in the art to meter power to the traction motor by periodically opening and closing. Control of chopper circuit 22 is effected by chopper control circuit 38 of a type well known in the art such as that described in the aforementioned GE SCR Manual. Chopper control circuit 38 provides "on" commands to initiate conduction of chopper circuit 22 by means of line 39 and also supplies "off" commands to terminate conduction of circuit 22 by means of line 40.

The duty factor on per-cent-on-time of chopper circuit 22 is determined by a current command signal implemented by the vehicle operator from a control console (not shown) in conjunction with a feedback signal which compares the actual current in the motor circuit in the commanded current. The feedback signal indicating actual current is derived from a current transducer 42 coupled to the motor armature circuit. The output of the current transducer 42 is connected through a resistor 44 to a summing junction 46 at a first input terminal of an amplifier 48. The operator current command signal is applied through a resistor 50 to summing junction 46 where the difference between the commanded current signal and the transducer 42 current signal produces an error signal $I_E$ which is applied to amplifier 48. The gain $K_1$ of amplifier 48 is determined by a resistor 52 connected between the output terminal of amplifier 48 and summing junction 46. A filter capacitor 54 connected in parallel with resistor 52 serves to smooth the ripple in the output signal from transducer 42 caused by chopping of the current applied to motor armature 18.

The output signal developed by amplifer 48 is essentially $K_1 I_E$ and is coupled through a resistor 56 to a summing junction 58 at the input terminal of an amplifier 60. The gain $K_2$ of amplifier 60 is primarily determined by a resistor 62 connected between summing junction 58 and an output terminal of amplifier 60. Connected in parallel with resistor 62 is the series combination of a resistor 64 and a capacitor 66, the latter combination serving to provide transfer function compensation for the current loop transfer function. The balance of the circuit components connected to amplifier 60 are associated with the present invention and are essentially non-functional during normal current control of the motor; consequently, they will be identified and discussed hereinafter.

The output terminal of amplifier 60 is connected to a first input terminal of a comparator 68. A second input terminal of comparator 68 is connected to an output terminal of a ramp generator 70 whereby to receive a ramp output signal. An output terminal of comparator 68 is connected to an input terminal of chopper control circuit 38. Comparator 68 provides a signal to control circuit 38 when the ramp generator 70 output signal magnitude coincides with the magnitude of the error voltage at the output of amplifer 60. The output signal from comparator 68 appropriately controls the time at which firing or gating signals are provided from chopper control circuit 38 via line 39 to chopper circuit 22. A clock oscillator 72 provides periodic lock signals to synchronize the operation of ramp generator 70 with the operation of chopper control circuit 38. In this regard an output terminal of oscillator 72 is connected to input terminals of both ramp generator 70 and control circuit 38 thus simultaneously providing clock signals to both circuits. The clock signals are utilized by ramp generator 70 to reset the ramp ouput signal to an initial condition and are utilized by control circuit 38 to generate the "off" command to be applied to chopper circuit 22.

For purposes of illustration the motor circuit is shown in the braking mode, i.e., motor brake switch 30 is in the brake (B) position thereby separating the armature and field circuits. In the braking mode the traction motor operates as a generator with current being generated by armature 18 as a function of current in field winding 20. The current from armature 18 circulates through the diode 34, chopper 22, motor smoothing reactor 24, resistor 26 and resistor 28 loop. However, during the non-conducting time of chopper circuit 22 the current generated by armature 18 must either be absorbed in capacitor 16 or be forced back into the power line L thereby resulting in what is known as regenerative braking. If for some reason the power line L is unable to absorb this current or if switch 12 is open the current will be unable to flow back into the power line and will tend to over charge capacitor 16 very rapidly and may result in over voltage stressing of the devices connected to the filter capacitor. In order to prevent this occurrence dynamic braking rather than regenerative braking is employed when braking current cannot be absorbed by line L. Dynamic braking is achieved by forcing armature current to flow through the series combination of an SCR 74 and a dynamic braking resistor 76, the series combination being connected in parallel circuit arrangement with chopper 22. During dynamic braking chopper circuit 22 serves to modulate the resistance of resistor 76 thereby controlling the amount of motor current. SCR 74 is supplied with a dynamic brake (DB) gating signal from the operator's console when dynamic brake mode is desired. When chopper circuit 22 is operating at maximum duty factor resistor 76 is essentially short circuited and no further current control can be effected by means of chopper circuit 22, since vehicle speed is decreasing with a corresponding decrease of armature current and braking torque. At this time armature current and thus braking torque can be maintained at the desired level by short-circuiting a selected one of the series resistors 26 and 28 and reducing the duty factor of chopper circuit 22. Accordingly, a control circuit function is provided for sensing when chopper circuit 22 is at a maximum duty factor or maximum "on" time and for implementing the closure of by-pass contacts 27 or 29 to short out the corresponding series resistor 26 or 28. This control function is implemented by means of a circuit which senses the output voltage developed by amplifier 60. In this regard the output terminal of amplifier 60 is connected through a first resistor 78 and a second resistor 82 to a first input terminal of a comparator 84. A filter capacitor 80 is connected between the junction intermediate resistors 78 and 82 and a ground or reference terminal. A second input terminal of comparator 84 is connected to a reference or B+ voltage from a regulated power supply (not shown). When the output signal from amplifier 60 reaches a level indicative of full on or maximum duty factor of chopper circuit 22, the voltage signal at the first input terminal of comparator reaches a magnitude at least as great as reference voltage B+ and causes the signal from comparator 84 to go from a normal low voltage to a high or logic 1 level voltage.

Although the logic 1 output signal developed by comparator 84 is utilized to initiate the operation of by-pass contacts 27 or 29, in order to assure that the contacts 27 and 29 are prevented from closing at a time when field current is not present, the output terminal of comparator 84 is connected to a first input terminal of an AND gate 85. A second input terminal of AND gate 85 is connected to field control circuit 36 for receiving a signal $I_f$ when the current in field winding 20 is at least a minimum predetermined level. An output terminal of AND gate 85 is then connected to a SET input terminal (S) of an edge-triggered R-S flip-flop 86 such that upon coincidence of the $I_f$ signal and the signal from comparator 85, a logic 1 signal is produced at the Q output terminal of flip-flop 86. Because the cam actuated by-pass contacts 27 and 29 are not precise in their operation, e.g., contact position may vary 20 percent either side of nominal and operating time varies with drive voltage, cam feedback signals indicative of the state of operation of the cam actuated by-pass contacts 27 and 29 are employed to precisely position the contacts. More particularly, the Q output terminal of flip-flop 86 is connected to a first input terminal of an AND gate 87, the AND gate 87 being controlled by a cam operated switch 89 connected between reference voltage B+ and a second input terminal of AND gate 87. The switch 89 is operated by one of a plurality of cams driven by a pilot motor 92, which pilot motor 92 also drives the cams controlling operation of by-pass contacts 27 and 29. Switch 89 is normally closed when contactor switch 27 is open; however, the cam which controls switch 89 is positioned such that switch 89 will open immediately prior to switch 27 closing. Since the action of switch 89 opening will disable AND gate 87, an additional cam actuated switch 98 having a closed time occurring during each operating cycle of pilot motor 92 provides an interlock signal to assure rotation of motor 92 through a prescribed arc.

Switch 98 is serially connected between a reference ground potential and an input terminal of an inverter 100. A resistor 106 connected between voltage source B+ and the input terminal of inverter 100 serves to bias the inverter when switch 98 is in the open position. An output terminal of inverter 100 is connected to a first input terminal of an OR gate 88, a second input terminal of OR gate 88 being connected to the output terminal of AND gate 87. An output terminal of OR gate 88 is connected to an input terminal of a power amplifier 90 whereby amplifier 90 will provide drive current during the closed time of switch 98 and/or the enable time of AND gate 87. The power-amp 90 provides a drive current to a pilot motor 92 thereby causing the pilot motor 92 to begin to rotate. Connected to pilot motor 92 are a plurality of cam controlled switches and contacts such as switches 89, 98, and 99 and contacts 27 and 29. As the cams are caused to rotate, they move sequentially through a plurality of positions. During this rotation selected switches are actuated and serve to identify the actual relative position of the motor 92. In the illustrated embodiment, only two by-pass contacts 27 and 29 are shown; however, it is to be understood that many other resistor by-pass contacts could be utilized. In the preferred embodiment, the switch 98 is a notch interlock switch driven by a geared cam operated from pilot motor 92 and serves as an indication that the pilot motor is actually rotating. For example, in one embodiment motor 92 is arranged to rotate through a 12° arc between rest positions each time a by-pass contact is to be actuated. Notch interlock switch 98 is arranged to close when the motor has rotated through 3° of arc and is arranged to open when the motor has rotated through 9° of arc thus providing a notch interlock signal during 6° of rotation of motor 92. Each of the by-pass contacts 27 and 29 are cam controlled to close when the motor has rotated through the first 6° of arc thus providing 3° of overlap between closing of the by-pass contacts and opening of the notch interlock switch 98. Therefore, it can be seen that between each of the contact positions, e.g., between the positions of contacts 27 and 29, as the motor is rotated the switch 98 will open for the first 3° rotation, closed for the next 6°, and then open for the last 3° of rotation. When notch interlock switch 98 closes a ground or low reference signal is applied through inverter 100 causing the output signal from inverter 100 to go to a high or logic 1 level and apply a logic 1 level signal to the first input terminal of OR gate 88. This signal results in the output of OR gate 88 being held at a logic 1 level for the entire period that notch interlock switch 98 is closed. This in turn forces power-amplifier 90 to provide motor current to pilot motor 92 to assure that the pilot motor is driven through the respective contact positions and into the next succeeding rest position.

In order to sequence the operation of contacts 27 and 29, the illustrated embodiment includes a logic arrangement to control by-pass contacts 29 and to prevent contacts 29 from being actuated when by-pass contacts 27 are actuated. This logic arrangement includes an AND gate 91 having a first input terminal connected to the output terminal of AND gate 85 and a second input terminal connected to the Q output terminal of flip-flop 86 through a time delay circuit 93. The output terminl of AND gate 91 is connected to a SET input terminal S of a flip-flop 95. Time delay circuit 93 assures that flip-flop 95 is not set during the same cycle as is flip-flop 86.

Coordination of the operation of pilot motor 92 with the operation of the cam controlled contacts 29 is achieved in a manner similar to that described with respect to contacts 27. In particular, the Q output terminal of flip-flop 95 is connected to a first input terminal of an AND gate 97, a second input terminal of gate 97 being connected through switch 99 to reference voltage B+, it being noted that switch 99 is closed so long as contacts 29 are open. An output terminal of AND gate 97 is connected to a third input terminal of OR gate 88 whereby, with switch 99 closed, AND gate 97 is enabled by flip-flop 95 and thus provides a drive signal through OR gate 88 and power-amplifier 90 to pilot motor 92.

It is obvious that upon closure of by-pass contacts 27 the effective resistance in the armature circuit will be suddenly reduced and that this reduction in resistance will result in a large amount of current rapidly propogating through the armature circuit creating an abnormal degree of braking. In order to prevent this result it has been the practice in the prior art to turn chopper circuit 22 off when a command has been received to close by-pass contacts such as contacts 27. This avoids an overcurrent condition by interrupting armature current; however, this shutdown of chopper circuit 22 results in a suddenly reduced current in the armature circuit and removes or reduces the normal braking effort and may result in an uncomfortable jerk of the traction motor and the associated vehicle. In order to avoid this undesirable change in braking effort the output signal from inverter 100 is coupled through a diode 102 and a resistor 104 to summing junction 58 at one input terminal of amplifier 60. Resistor 104 is sized such that the signal from inverter 100 causes the output signal from amplifier 60 to go to an intermediate magnitude between the magnitude indicative of the maximum duty factor and the magnitude indicative of a minimum duty factor of chopper circuit 22. For example, the level might be at a mid-point between maximum and minimum such that the chopper circuit 22 is phased back from its maximum duty factor to a 50% duty factor during the transition time between when switch 98 is closed and is subsequently opened. Either contacts 27 or 29 are closed during the period when switch 98 is closed and in this period partial control is still available via resistor 56 and amplifier 48. When switch 98 is open the reference voltage B+ applied through a resistor 106 to the input terminal of inverter 100 prevents the output signal from inverter 100 from having any effect upon the error signal at summing junction 58 of amplifier 60.

Due to the relatively fast time constant of the current control loop, the loop is able to react rapidly to the introduction of a reduced error signal into amplifier 60 and to phase back the duty factor of chopper circuit 22 to an intermediate level to thereby prevent large current and corresponding jerks of the traction motor when a resistor is shorted. Since the signal from inverter 100 is removed just after the closing of either one of the by-pass contacts, the control loop is under full control of the error signal and is able to immediately move the duty factor of chopper circuit 22 to a value necessary to regulate the current through the motor at the desired level.

As discussed previously, in the dynamic braking mode the current from armature 18 flows through braking resistor 76 and creates an average voltage across chopper circuit 22. This average voltage is generally sufficient to provide charging current to capacitor 16. However, when chopper circuit 22 is operating at maximum duty factor, resistor 76 is essentially short circuited such that current flow into capacitor 16 may fall below the level necessary to maintain a sufficient voltage amplitude to control field winding 20 by means of field control circuit 36. In order to prevent the energy stored in capacitor 16 from being depleted below a minimum sustaining level during dynamic braking there is provided an additional circuit including means for limiting the duty factor of chopper circuit 22 when the voltage of capacitor 16 falls below a minimum predetermined level. In particular, this circuit comprises a flip-flop 108 having a set input terminal connected to the ouput terminal of AND gate 85 and a reset input terminal connected to the output terminal of inverter 100. The Q or true output terminal of flip-flop 108 is connected into a first input terminal of AND gate 110. A second input terminal of AND gate 110 is connected to receive a signal indicative of the voltage on capacitor 16. This signal is derived from the output of a comparator 112, comparator 112 having one input terminal connected to a voltage divider network comprising resistors 114 and 116 connected across capacitor 16 and a second input terminal connected to reference voltage B+. When the voltage at the junction intermediate resistors 114 and 116 falls below the magnitude of voltage B+ the comparator 112 provides a high voltage or logic 1 level signal to the second input terminal of AND gate 110. As is well known, the output terminal of AND gate 110 will go to a logic 1 signal level only if both input terminals are at logic 1 levels. The output terminal of AND gate 110 is connected through a diode 118 and a resistor 120 to a junction 122 in the feedback circuit of amplifier 60. Junction 122 is connected through a resistor 124 to a source of B− voltage (not shown) and through a resistor 126 to the output terminal of amplifier 60. A resistor 128 connects junction 122 to the base terminal of a transistor 130. Transistor 130, resistor 128, resistor 124, and resistor 126 comprise a clamp circuit which serves to limit the output level of amplifier 60 to some predetermined maximum such as, for example, a maximum level corresponding to a duty factor for chopper circuit 22 of 80%. This assures that the chopper circuit 22 is immediately phased back to an intermediate level if the voltage on capacitor 16 falls below some minimum sustaining level. In turn, this assures that additional current will be supplied to capacitor 16 to thereby allow the field control circuit 36 sufficient power to control field winding 20 and accordingly to control the braking effort. The clamp circuit allows the voltage from amplifier 60 to reach a level corresponding to 100% duty factor when the output signal from AND gate 110 is at a logic 0 level.

The operation of the inventive brake control circuit will be described with respect to the dynamic braking situation wherein switch 12 is open and the motor brake switch is in the brake position (B) with by-pass contacts 27 and 29 initially open and with a dynamic brake command being applied to the gate terminal of SCR 74. In this instance the armature current flows from armature 18 up through diode 34, through SCR 74, dynamic brake resistor 76, motor reactor 24, resistor 26 and resistor 28 back to the armature. Under control of chopper circuit 22 the resistance of resistor 76 is varied to maintain the armature current at a level as commanded by the current command signal into resistor 50. This is achieved by the feedback signal from current transducer 42 through resistor 44 being summed with a current command signal at summing junction 46 to develop an error signal to drive amplifier 48. This error signal forces the output of amplifier 48 and amplifier 60 to the magnitude required to cause comparator 68 to produce an output signal effective to control the duty factor of chopper circuit 22 by means of chopper control circuit 38 in a manner tending to minimize the error signal. When the duty factor of chopper circuit 22 is increased to its maximum level, the output of amplifier 60 is then at a level equivalent to the B+ level applied to the second input terminal of comparator 84. This causes comparator 84 to change state and provide a logic 1 output signal to an input terminal of AND gate 85. If field current is present so that braking effort can be put forth, the $I_f$ signal at the second input terminal of AND gate 85 will enable gate 85 so that the signal from comparator 84 will be applied to the SET terminal of flip-flop 86. This signal causes flip-flop 86 to set such that a logic 1 signal is developed at the Q output terminal. This logic 1 signal from flip-flop 86 is applied to both AND gate 87 and AND gate 91. Since switch 89 is closed, AND gate 87 is enabled and produces a logic 1 signal; however, time delay 93 prevents the logic 1 signal from AND gate 85 from, being applied to AND gate 91 so that this latter gate is not enabled. The logic 1 signal from AND gate 87 enables OR gate 88 which gate 88 in turn enables power amplifier 90 to apply drive current to pilot motor 92 to cause the associated cams to begin to rotate. The notch interlock switch 98 closes when its geared cam has rotated approximately 3° and causes a ground to be applied to inverter 100 resulting in a positive voltage level being produced at the output terminal of inverter 100. This positive voltage level is applied through OR gate 88 to power-amplifier 90 to thereby maintain the drive current to pilot motor 92 to assure that the motor rotates through the required angle to effect closure of by-pass contacts 27. During this driving period switch 89 opens and disables AND gate 87. The positive voltage level from inverter 100 is also applied through diode 102 and resistor 104 to summing junction 58 at the input terminal of amplifier 60 to thereby force the duty factor of chopper circuit 22 to an intermediate level. As the pilot motor continues to drive through its appropriate segment, the notch interlock switch 98 opens just after closure of switch 27 removing the positive voltage level from OR gate 88 and causing the power amplifier 90 to be turned off. However, the mechanical loading and plugging of the pilot motor 92 cause sufficient overshoot of the motor 92 to effect complete rotation of motor 92 into the next rest position. At this point the resistor 26 is shorted out and the armature current flowing around the loop now begins to increase thereby causing a larger current signal to be developed by transducer 42. This signal is summed with the reference command signal at summing junction 46 and the fast response of the control loop results in a phase back of the chopper circuit 22 to a minimum level. It is noted that the pilot motor 92 runs through its initial rotation period in the illustrated embodiment of about 3° before the notch interlock switch 98 closes and provides a phase back signal to amplifier 60 by means of inverter 100. Accordingly, the chopper circuit 22 is forced to an intermediate duty factor only during that portion of the transition period beginning after rotation of the pilot motor has begun and ending when the pilot motor 92 has reached essentially the end of its rotation and contacts 27 are closed. If prior to the closure of switch 98 the voltage on capacitor 16 due to the maximum duty factor of chopper circuit 22 has dropped below some predetermined minimum level the output of comparator 112 will provide a logic 1 signal which will, in conjunction with the logic 1 signal from flip-flop 108, cause the output of AND gate 110 to go to a logic 1 level. Upon this occurrence, the voltage at junction 122 will drop to a magnitude sufficient to cause transistor 130 to conduct current and limit the output of amplifier 60 to a level sufficient to cause comparator 68 to provide a signal to chopper control circuit 38 which will cause chopper circuit 22 to be phased back to a duty factor which will allow some current to be pumped into capacitor 16, typically about 80% of the maximum conduction duty factor.

Once contacts 27 have been closed, a subsequent excursion of chopper circuit 22 to a maximum duty factor will result in AND gate 91 being enabled since flip-flop 86 remains in a SET condition. Accordingly, flip-flop 95 will be SET and a logic 1 signal will be applied through AND gate 97 to OR gate 88 again resulting in power being applied to pilot motor 92. During this cycle of rotation switch 98 will again be closed to effect an interlock condition and switch 99 will be opened to disable AND gate 97.

As can be seen, the RESET terminals R of flip-flops 86 and 95 are connected to receive a motor-brake (M/B) command. This command is supplied from an operator's console (not shown) and indicates by a logic 1 or a logic 0 that the vehicle is in a brake or a motor mode respectively. The M/B signal is also applied to AND gate 110 to disable the voltage monitoring circuit during motoring. The M/B signal is also utilized to reset the logic circuitry when transitioning to a brake mode since the pilot motor 92 is transitioned to an initial condition at this time, the initial condition being where all resistor by-pass contacts 27 and 29 are in the open position. This same M/B signal is also utilized to position the contacts 27 and 29 in a closed position during motoring. The circuitry for transitioning motor 92 is well known in the art and may be implemented when transitioning to braking, for example, by a separate cam actuated switch 137 driven by motor 92 which switch may open only at a single position and may thus be utilized to drive motor 92 to a fixed position. To accomplish this function, an AND gate 83 is connected to receive both the M/B command and the signal from switch 137. Gate 83 is connected to supply a drive signal to amplifier 90 via OR gate 88 when the M/B signal is present and motor 92 is not in the initialing position. The M/B signal is inverted by an inverter 132 and applied to a first input terminal of an AND gate 134 in order to position by-pass contacts 27 and 29 in a closed positionn during motoring. A second input terminal of AND gate 134 is connected through cam controlled switch 136 to source B+. This arrangement forces motor 92 to drive to a predetermined motoring position during motoring. Since this notoring position cycles all the cam controlled switches, motor 92 is constrained in this position so long as the M/B signal is at a logic 0 level.

Referring now to FIG. 2 there is shown an alternate embodiment of the present invention in which the cam driven contacts 27 and 29 have been replaced by electromechanical actuator controlled contacts K1A and K2A. For puposes of clarity several elements of the embodiment of FIG. 1 are shown; however, only those elements unique to this alternate embodiment will be described hereinafter since the common elements are functionally identical. In this embodiment the output signal from flip-flop 86 is applied to an input terminal of an amplifier circuit 132, which circuit 132 acts as a driver for electromechanical actuator K1. In order to provide a signal to phase back the duty factor of chopper circuit 22 during the transition time of contacts K1A there are provided auxiliary contacts K1B and K1C mechanically connected to main contacts K1A. The K1B and K1C contacts bracket the motion of contacts K1A in such a manner that the contact K1C opens before K1A closes and the contacts K1B close after contact K1A has closed. A fourth set of contacts K1D also mechanically coupled to main contacts K1A operate in conjunction with K1A to provide a feedback signal indicating that K1A has operated. Proper sequencing of the operation of contacts K1A and K2A is achieved by connecting the contacts K1D serially between reference voltage B+ and one input terminal of an AND gate 134. A second input terminal of AND gate 134 is connected to the output terminal of AND gate 85 via an OR gate 138. Thus when the output of AND gate 85 goes to a logic 1 level indicating that chopper circuit 22 is at its maximum duty factor, and assuming that contactor K1A has previously been closed, AND gate 134 will be enabled and provide an output signal to flip-flop 95. Flip-flop 95 will then be forced into a SET condition and will provide an output signal to an amplifier 136, which amplifier 136 is utilized as a driver circuit for electromechanical actuator K2. This will enable actuator K2 and cause contacts K2A to being closing. As with the K1 actuator, auxiliary contacts K2B and K2C mechanically coupled to contacts K2A bracket the motion of main contacts K2A so that a signal is provided to inverter 100 indicating that the main contacts are in motion. By virtue of the operation of the auxiliary contacts a signal is provided from inverter 100 to junction 58 of the input terminal of amplifier 60 which causes the chopper circuit 22 to be phased back to some intermediate level as was described previously in conjunction with the cam actuated switching arrangement. In this embodiment an additional OR gate 138 having a first input terminal connected to receive the M/B command from inverter 132 and a second input terminal connected to the output terminal of AND gate 85 provides an interlock function to close contacts K1A and K2A during motoring. In the braking mode OR gate 138 will not effect the operation of the control circuit since the signal at its output terminal will track the output signal from AND gate 85.

There has heretofore been described a control system which provides smooth transitioning of by-pass contacts or switches in a chopper controlled motor drive by coordinating the closing of by-pass contacts to the reduction of chopper duty factor in such a manner that the duty factor is modified during the time that the contacts are actually in motion. Accordingly, the time periods during which the chopper is operating at an undesired duty factor is minimized. In addition, the chopper duty factor is forced to an intermediate value during the transitioning period to further minimize power transients and to maintain the control in a closed loop condition wherein externally generated transients may be compensated. There has been further described a method and apparatus for assuring adequate control ability under dynamic braking conditions by preventing complete discharge of the system filter capacitors.

While the principles of the invention have now been made clear in an illustrated embodiment there will be immediately obvious to those skilled in the art many modifications, constructions and arrangements used in the practice of the invention which are particularly adapted for specific environments and operating requirements without departing from these principles. The appended claims are therefore intended to cover and embrace any such modifications, subject only to the true spirit and scope of the invention.

What is claimed as new and desire to secure by Letters Patent of the United States is:

1. A control system for effecting smooth resistor staging during electrical braking of a chopper controlled d-c electric motor comprising:
   a. a plurality of resistor stages serially connected in a motor current path, each of said stages including a resistor and power switching means having normally open main contacts connected in parallel circuit arrangement with said resistor;
   b. a chopper circuit including dynamic braking means connected in said motor current path for providing a series impedance the magnitude of which can be varied between minimum and maximum limits;
   c. sensor means for sensing motor current in said path and for providing a feedback signal proportional thereto;
   d. means for supplying a reference signal proportional to a desired motor current;
   e. summing means for summing said reference signal and said feedback signal and for providing an error signal proportional to any difference in magnitude therebetween;
   f. control means connected to receive said error signal and responsive thereto to vary the impedance of said chopper circuit in a manner tending to reduce said error signal to a minimum value, said control means including means for selectively actuating the power switching means in said resistor stages when the impedance of said chopper circuit reaches said minimum limits, each power switching means being operative when actuated to effect closure of its respective main contacts to thereby short-circuit the corresponding resistor;
   g. detector means coupled to the main contacts of each power switching means for sensing operation thereof, said detector means providing an output signal during operation of said main contacts; and
   h. means responsive to said output signal for changing said error signal only during closing operation of said main contacts to a magnitude which causes said control means to adjust said chopper circuit impedance to a value intermediate said minimum and maximum limits.

2. The control system as defined in claim 1 wherein said detector means comprises a set of normally open auxiliary contacts and a set of normally closed auxiliary contacts, said auxiliary contacts being mechanically coupled for operation with said main contacts whereby said normally closed auxiliary contacts open before said main contacts close and said normally open contacts close after said main contacts close.

3. The control system as defined in claim 1 wherein the impedance of said chopper circuit is adjusted to a value approximately midway between said minimum and maximum limits during closing operation of said main contacts.

4. The control system as defined in claim 1 wherein said means for changing said error signal comprises means for summing said output signal with said error signal to thereby change the magnitude of said error signal during operation of said main contacts.

5. The control system as defined in claim 2 wherein said power switching means in each of said resistor stages comprises an electromechanical actuator operatively coupled to the main contacts.

6. The control system as defined in claim 5 and including a logic circuit connected to provide actuating signals to the electromechanical actuators of the switching means in said resistor stages in a predetermined sequence to thereby effect sequential operation of said actuators.

7. The control system as defined in claim 6 wherein each of said electromechanical actuators includes a further set of auxiliary contacts mechanically coupled to said main contacts for providing a signal to said logic circuit indicative of previously actuated electromechanical actuators.

8. The control system as defined in claim 1 wherein the main contacts of the power switching means are sequentially located on switch means actuated by a cam.

9. The control system as defined in claim 8 wherein said cam is driven in a stepwise fashion by an electrical motor.

10. The control system as defined in claim 9 wherein said detector means comprises a set of auxiliary contacts mechanically coupled to said cam actuated switch means, said auxiliary contacts being arranged to operate over a predetermined arc of rotation of said cam in each of said stepwise movements.

11. The control system as defined in claim 10 wherein operation of said auxiliary contacts produces an interlock signal, said interlock signal being effective, once said motor is actuated, to assure rotation of said electrical motor through an arc sufficient to close said main contacts.

12. The control system as defined in claim 1 and including circuit means responsive to the average voltage across said chopper circuit when said chopper circuit impedance reaches said minimum limit for limiting said error signal to a first predetermined magnitude if said average voltage is less than a second predetermined magnitude.

13. A control system for a chopper controlled d-c electric motor comprising:
  a. a chopper circuit serially connected between a d-c power source terminal and a d-c electric motor for metering current to the armature windings of said motor;
  b. control means connected to supply repetitive "on" and "off" gating signals to said chopper circuit, said chopper circuit being responsive to said gating signals to begin conducting current upon receipt of said "on" gating signal and to cease conducting current upon receipt of said "off" gating signal;
  c. means responsive to current in said motor armature for providing an error signal representative of the difference between the actual and the desired magnitudes of motor current;
  d. means for applying said error signal to said control means for controlling the time intervals between said "on" and "off" gating signals to thereby vary the duty factor of said chopper circuit between maximum and minimum limits; and
  e. means operational when said duty factor is at said maximum limit to monitor the average voltage at said source terminal, said monitoring means being responsive to said voltage being less that a predetermined magnitude to reduce said duty factor.

14. The control system as defined in claim 13 and including a plurality of resistor stages serially connected in a path of motor armature current, each of said stages including a resistor and a set of normally open main contacts connected in parallel circuit arrangement with said resistor, said control system being responsive to said duty factor being at said maximum limit for effecting closure of the set of said main contacts associated with a selected resistor stage, and said control system including means for detecting motion of said main contacts and for reducing said duty factor to a level intermediate said minimum and maximum limits during motion of said main contacts.

* * * * *